United States Patent [19]

Iida et al.

[11] Patent Number: 4,816,860
[45] Date of Patent: Mar. 28, 1989

[54] CAMERA

[75] Inventors: Takashi Iida, Kyoto; Masatoshi Itoh, Takatsuki; Hidenori Fukuoka, Toyonaka; Takeya Tsukamoto, Amagasaki; Takashi Kondo, Izumi; Daigo Yoshioka, Toyonaka; Hiroyuki Tsumazawa, Kyoto; Atsushi Kuwada, Amagasaki; Kazuhiko Kojima, Osaka, all of Japan

[73] Assignee: Minolta Camera Kabushiki Kaisha, Osaka, Japan

[21] Appl. No.: 70,815

[22] Filed: Jul. 7, 1987

[30] Foreign Application Priority Data

| Jul. 7, 1986 | [JP] | Japan | 61-104787[U] |
| Aug. 29, 1986 | [JP] | Japan | 61-204792 |
| Feb. 4, 1987 | [JP] | Japan | 62-24141 |
| Feb. 5, 1987 | [JP] | Japan | 62-25038 |
| Feb. 9, 1987 | [JP] | Japan | 62-28680 |
| Feb. 9, 1987 | [JP] | Japan | 62-29155 |

[51] Int. Cl.$^4$ .............................. G03B 3/00
[52] U.S. Cl. .................... 354/402; 354/145.1; 354/400; 352/140
[58] Field of Search .......... 354/400, 402, 195.1, 354/195.11, 195.12, 195.13; 352/140

[56] References Cited

U.S. PATENT DOCUMENTS

| 3,486,432 | 12/1969 | Norwood | 354/195.13 |
| 3,927,414 | 12/1975 | Moriyama et al. | 354/195.1 |
| 3,972,056 | 7/1976 | Tsujimoto et al. | |
| 4,002,405 | 1/1977 | Stahl | 354/195.1 |
| 4,043,642 | 8/1977 | Hirose et al. | |
| 4,225,219 | 9/1980 | Shimizu | 354/195.12 |
| 4,404,595 | 9/1983 | Ushiro et al. | 354/402 |
| 4,445,757 | 5/1984 | Enomoto et al. | |
| 4,508,443 | 4/1985 | Matsuzaki et al. | |
| 4,525,053 | 6/1985 | Shiokama et al. | |

FOREIGN PATENT DOCUMENTS

| 54-97017 | 7/1979 | Japan |
| 56-47533 | 11/1981 | Japan |
| 57-173268 | 10/1982 | Japan |
| 57-196665 | 12/1982 | Japan |
| 58-152619 | 10/1983 | Japan |
| 59-55735 | 4/1984 | Japan |
| 60-176415 | 11/1985 | Japan |
| 60-252312 | 12/1985 | Japan |
| 61-98310 | 5/1986 | Japan |
| 61-128612 | 8/1986 | Japan |
| 60-264307 | 11/1986 | Japan |
| 61-259210 | 11/1986 | Japan |
| 62-19827 | 1/1987 | Japan |
| 62-60368 | 3/1987 | Japan |
| 62-112112 | 5/1987 | Japan |
| 62-109031 | 5/1987 | Japan |

Primary Examiner—Russell E. Adams
Attorney, Agent, or Firm—Burns, Doane, Swecker & Mathis

[57] ABSTRACT

A camera such as a vide camera having an automatic focusing function, a power focusing function and a power zooming function which allows most reasonable change-over between the functions of the camera. The camera comprises manually operable mode change-over means for alternatively changing over the camera between a zooming mode and a focusing mode, and manually operable instructing means for instructing a direction of movement of a zooming lens system or a focusing lens system for zooming or focusing. When the zooming mode is selected, first actuating means actuates the zooming lens system for zooming in a direction instructed by the instructing means, but when the focusing mode is selected, second actuating means actuates the focusing lens system for focusing operation in a direction instructed by the instructing means. Several forms of instructing means are disclosed.

29 Claims, 13 Drawing Sheets

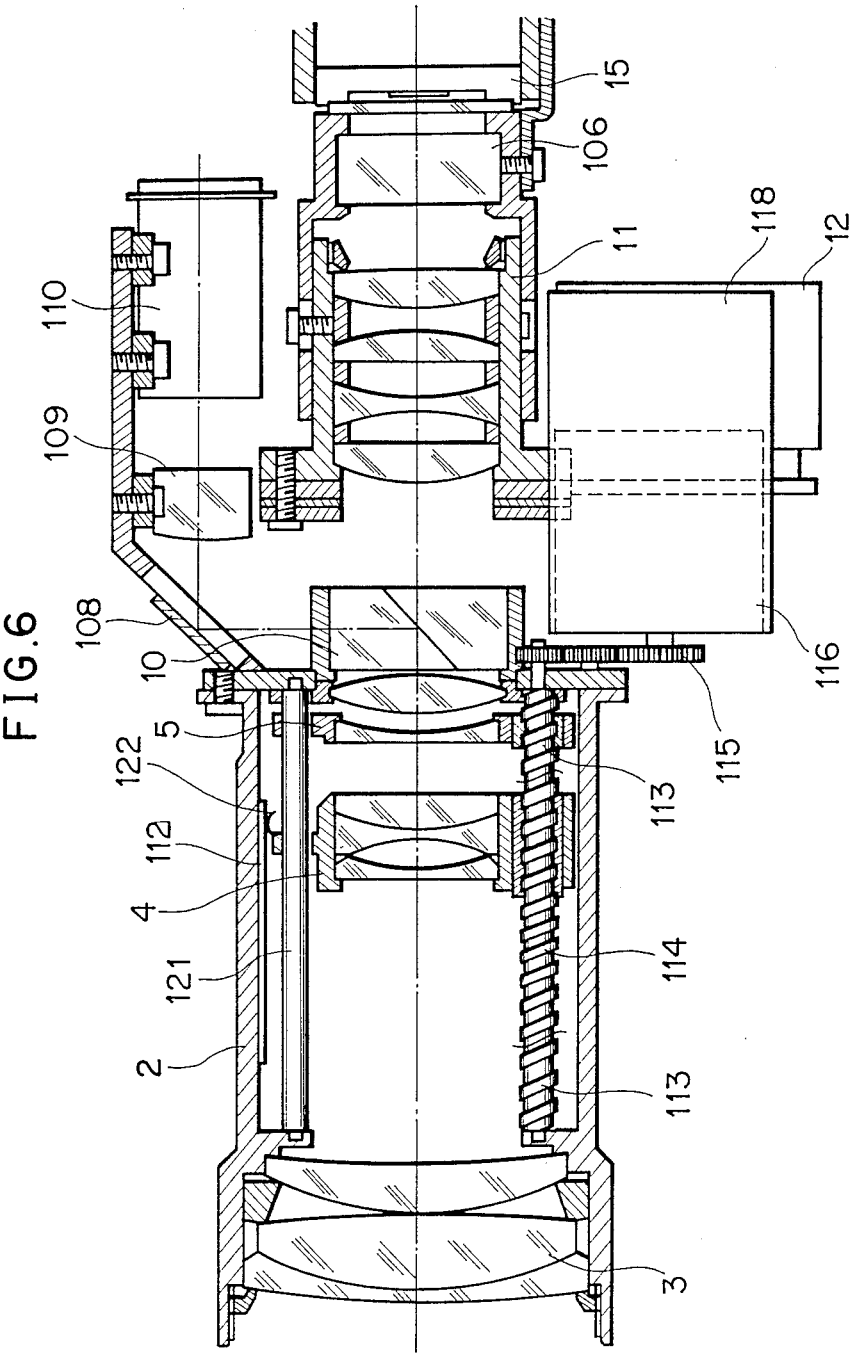

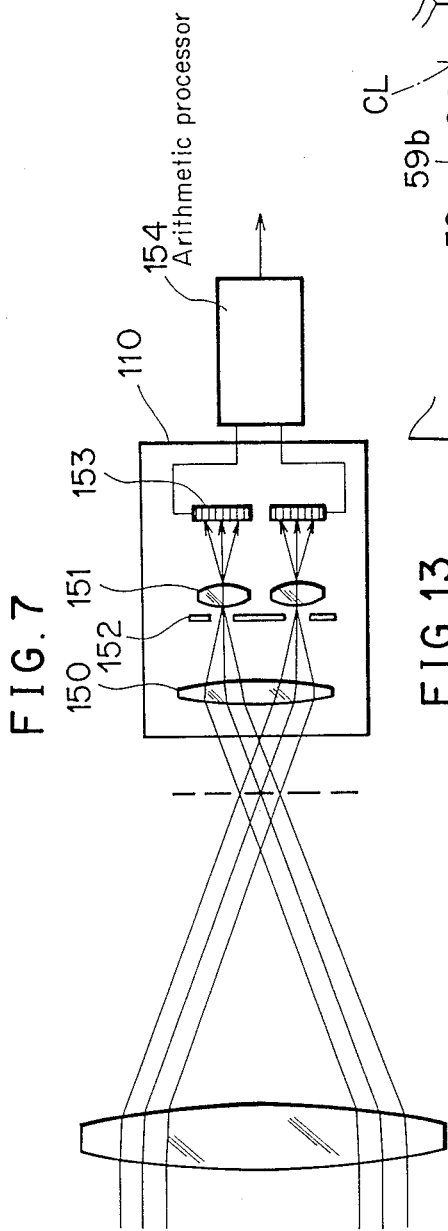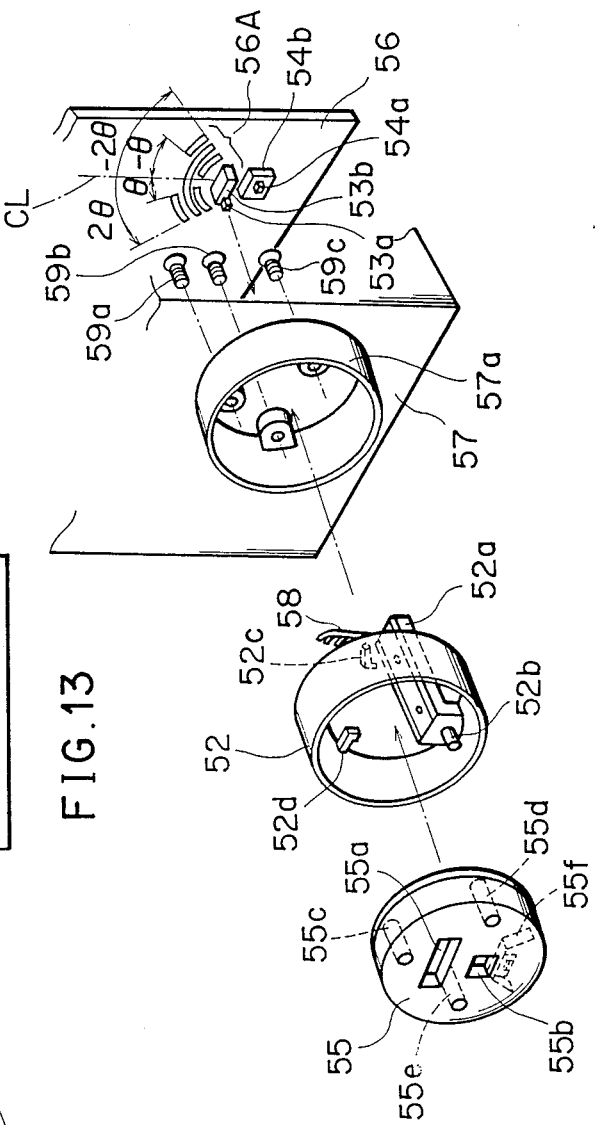

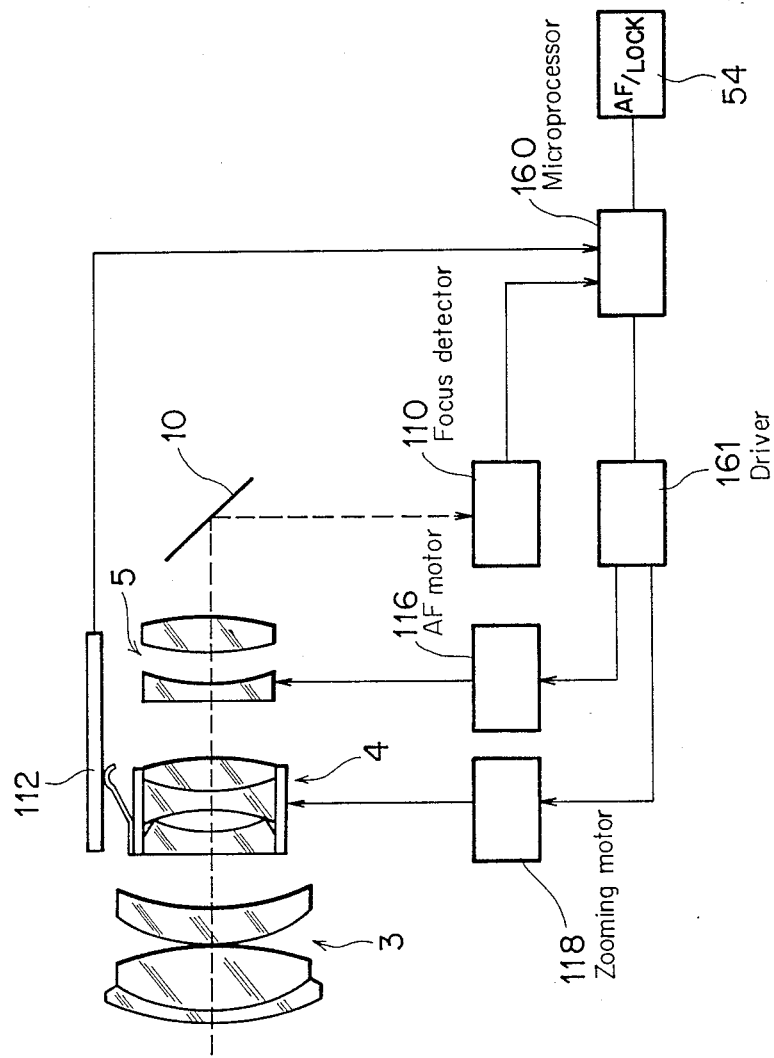

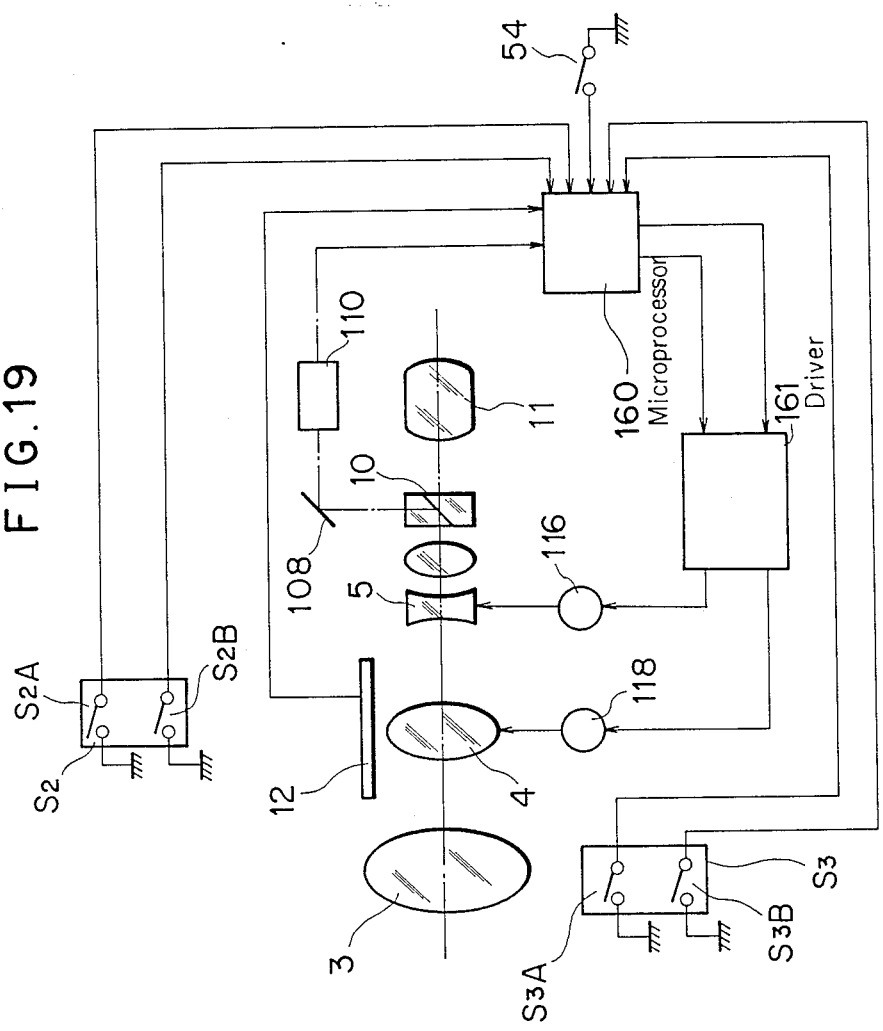

CAMERA

BACKGROUND OF THE INVENTION

1. Field of the Invention

This invention relates to a camera and more particularly to a camera of the type which includes a zooming lens connected to be driven by a motor for zooming operation and a focusing lens connected to be driven by a motor for focusing operation.

2. Description of the Prior Art

A video camera is already known which has a power zooming mode for actuating a zooming lens by means of a motor and an automatic focusing mode.

In photographing using such a video camera, a photographer may sometimes want to stop the automatic focusing function and manually focus the video camera. In such a case, if a photographing lens system is actuated for focusing (power focusing) similarly as in power zooming as disclosed, for example, in Japanese Patent Publication No. 59-12983, it is very convenient in that a photographer can focus the camera while keeping himself ready for photographing without the necessity of specially turning a lens barrel by manual operation.

However, a conventional video camera is defective in change-over between the different modes. In particular, there is a problem, for example, in that since automatic focusing is not performed by an automatic focusing device while the camera is under a power focus mode, the camera may be defocused due to a change in position of an image forming plane by zooming operation.

SUMMARY OF THE INVENTION

It is an object of the present invention to provide a camera which has an automatic focusing mode, a power focusing mode and a power zooming mode and resolves the problem of the conventional camera described above.

It is another object of the invention to provide a construction and an arrangement of a camera having an automatic focusing mode, a power focusing mode and a power zooming mode which allow most reasonable change-over between the modes of the camera.

In order to attain the objects, according to the present invention, a camera comprises a lens device including a zooming lens system and a focusing lens system, first actuating means for actuating said zooming lens system for zooming, second actuating means for actuating said focusing lens system for focusing, manually operable mode change-over means for alternatively changing over said camera between a zooming mode in which a zooming operation is performed by said first actuating means and a focusing mode in which a focusing operation is performed by said second actuating means, manually operable moving direction instructing means for instructing a direction of movement of said zooming or focusing lens system for zooming or focusing, and control means operable in response to the zooming mode selected by said mode change-over means for causing said first actuating means to perform a zooming operation in response to said moving direction instructing means and operable in response to the focusing mode selected by said mode change-over means for causing said second actuating means to perform a focusing operation in response to said moving direction instructing means.

In the camera, the first and second actuating means are both activated by an instruction signal from the manually operable moving direction instructing means to actuate the zooming lens system or the focusing lens system in one of opposite directins for zooming or focusing, and which one of the first and second means is to be actuated by an instruction signal is determined by operation of the manually operable mode change-over means. Accordingly, zooming operation and focusing operation can be performed by operation of the common manually operable means, by which reduction in number of operating parts or elements can be attained.

The above and other objects, features and advantages of the present invention will become apparent from the following description and the appended claims, taken in conjunction with the accompanying drawings.

BRIEF DESCRIPTION OF THE DRAWINGS

FIG. 6 is a detailed vertical sectional view of a photographing lens system of the video camera;

FIG. 7 is a schematic view illustrating general construction of a focus detecting device of the photographing lens system of FIG. 6;

FIG. 9 is a schematic view illustrating general construction of an actuating system for the photographing lens system of FIG. 6;

FIG. 13 is a fragmentary perspective view showing a modified form of photographing optical system actuating operating device for a video camera;

FIG. 19 is a schematic illustration of a video camera according to another embodiment of the present invention.

DETAILED DESCRIPTION OF THE PREFERRED EMBODIMENTS

Figure 1:
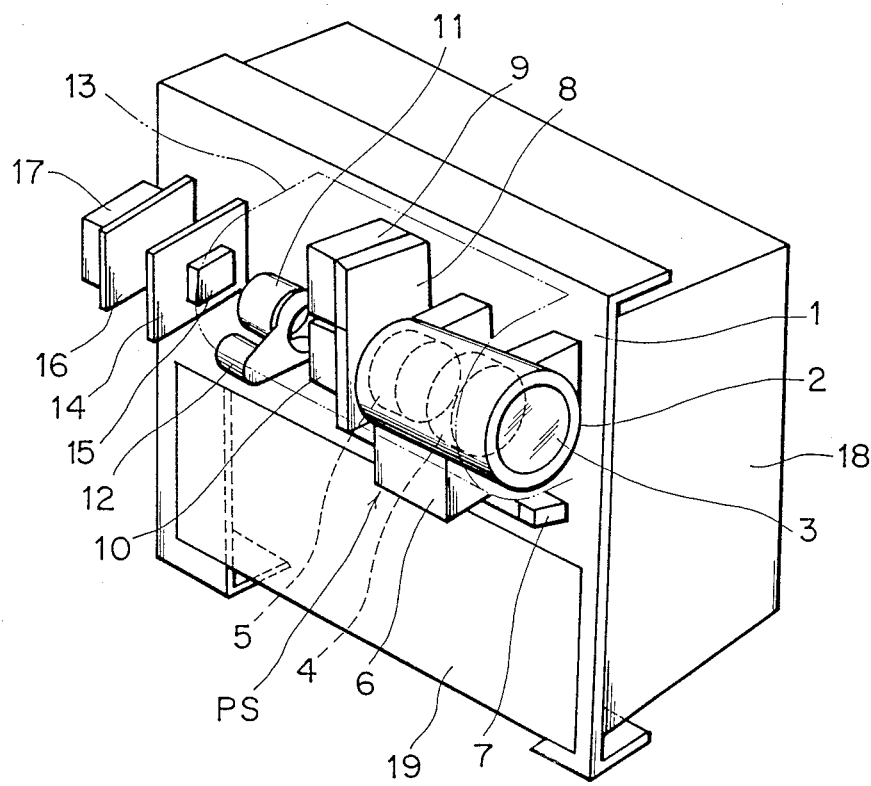
FIG. 1 is a perspective view of an internal structure of a video camera according to an embodiment of the present invention.

Referring to FIG. 1, there is shown in a perspective view an internal structure of a video camera with a built-in video tape recorder according to an embodiment of the present invention. The video camera shown includes a frame 1, and a lens block 2 secured to the frame 1. The lens block 2 includes a front lens group 3 secured at a fixed location relative to a direction of an optical axis L of the lens block 2, a variator lens group 4 mounted for movement in the direction of the optical axis L for varying the focal length of a photographing optical system PS, and a compensator lens group 5 also mounted for movement in the direction of the optical axis L for focusing the photographing optical system PS.

Located below the lens block 2 is a driving device 6 in which a zooming motor for moving the variator lens group 4 and a focusing motor for moving the compensator lens group 5 are mounted. Though not shown in FIG. 1, an encoder for detecting a position of the variator lens group 4 and some other elements are also contained in the driving device 6. A white balancing light receiving device 7 is located in front of the driving device 6.

A fixed base plate 8 is located uprightly behind the lens block 2 and has mounted thereon an automatic focusing sensor 9, a half prism 10, a master lens group 11, an exposure meter 12 and so on. The half prism 10 is provided for introducing part of light flux passing through the three groups of lenses 3 to 5 to the automatic focusing sensor 9.

A control device not shown for controlling operation of the driving device 6, white balancing light receiving device 7, automatic focusing sensor 9, exposure meter 12 and so on is mounted on a flexible lens board 13 which extends in such a manner that it covers or partly surrounds the various elements listed above.

Located behind the master lens group 11 are a CCD (charge coupled device) 15 which is soldered to a base plate 14, and an EVF (electronic view finder) 17 which is soldered to another base plate 16 and may be a flattened fluorescent display tube.

Thus, the front lens group 3, variator lens group 4, compensator lens group 5, half prism 10, master lens group 11 and so on constitute the photographing optical system PS for forming a picture image on the CCD 15.

A video circuit board 18 and a VTR (video tape recorder) 19 for recording a picture image photographed by the video camera on a video tape are also secured to the frame 1. The video circuit board 18 carries thereon a controlling device not shown for processing output signals of the CCD 15 and for controlling operation of the entire video camera.

Figure 2:
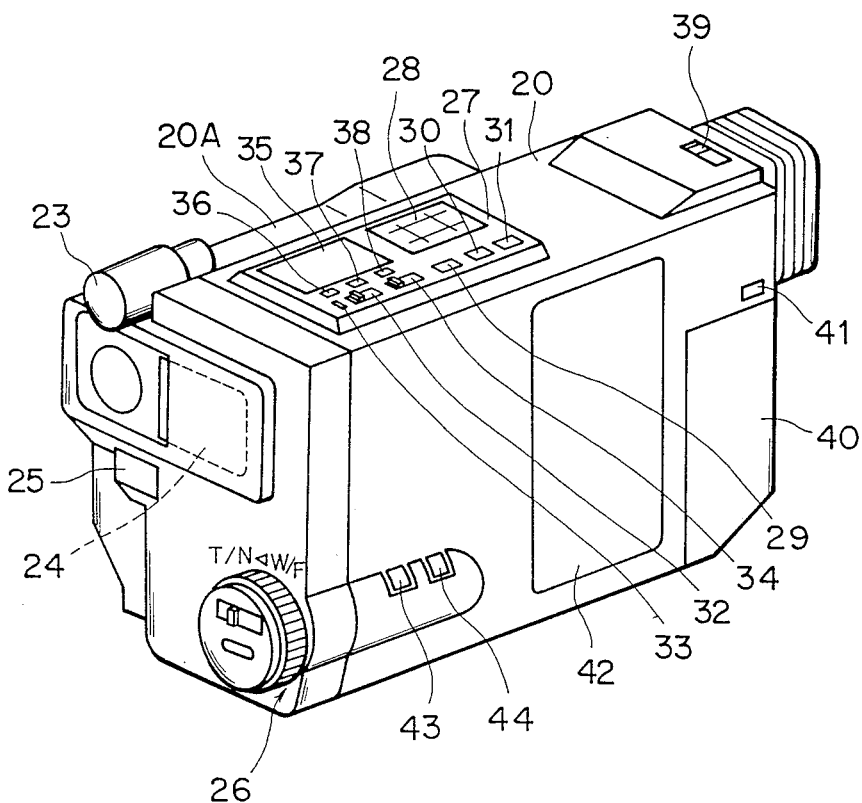
FIG. 2 is a perspective view of the entire video camera showing an appearance thereof as viewed from its front side.
Figure 3:
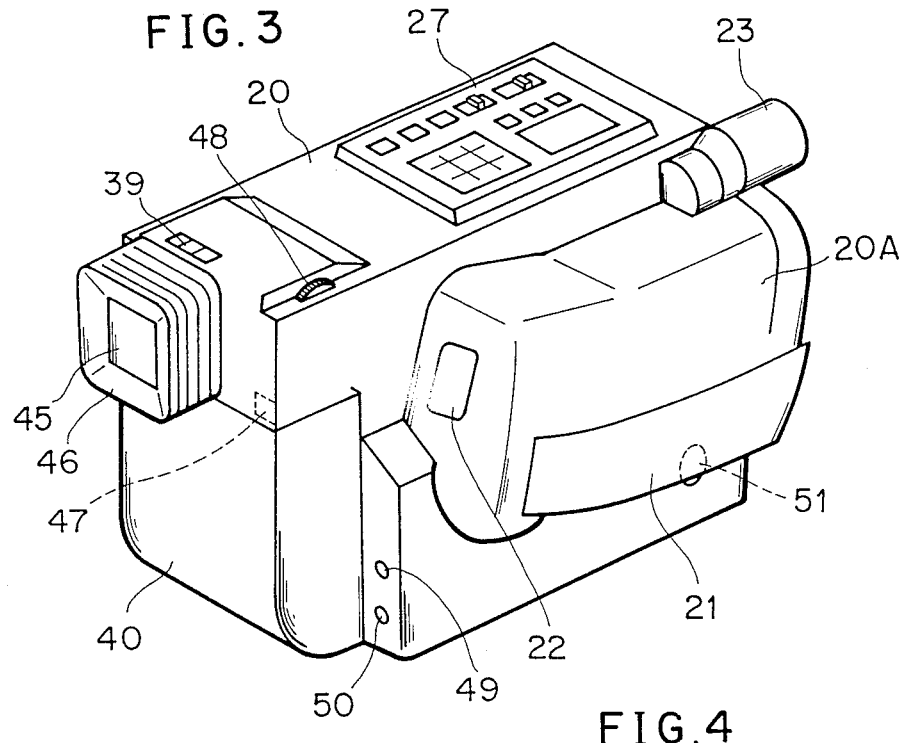
FIG. 3 is a perspective view of the entire video camera showing an appearance thereof as viewed from its rear side.

Referring now to FIGS. 2 and 3, the video camera is shown in perspective views of an appearance as viewed from the front and rear thereof. A camera body 20 has a grip 20A integrally formed at and extending sidewardly from a right side portion thereof as viewed from the rear as seen in FIG. 3. The several elements described above including the lens block 2 are contained in the grip 20A. A hand strap 21 is attached to a side of the grip 20A, and a trigger button 22 for starting photographing is located at a rear portion of the grip 20A. A sound recording microphone 23 is removably mounted at an upper portion of the grip 20A.

The front lens 3 of the lens block 2 is located adjacent a forward end of the grip 20A and directed forwardly. A slider 24 for protecting the lenses 3 to 5 within the lens block 2 is mounted for sliding movement in a direction indicated by an arrow mark X in FIG. 2 on the camera body 20. A white balancing light receiving window 25 made of a white diffuser plate is located at a portion of the camera body 20 below the slider 24 and forwardly of the white balancing light receiving device 7 within the camera body 20.

Located at a lower portion of the front face of the camera body 20 is a photographing optical system actuating operating device 26 which is manually operated to cause operations for varying the focal length of and focusing the photographing optical system PS. Construction and operation of the photographing optical system actuating operating device 26 will be hereinafter described in detail.

An operation panel 27 is located on a top face of the camera body 20. The operation panel 27 has various members provided thereon including deck controlling switches 28 for causing the VTR 19 to operate in various operation modes, an exposure lock switch 29 for temporarily fixing the exposure, a white balance lock switch 30 for locking a white balance, a date switch 31 for selecting whether or not the date is to be recorded, a power switch 32 for connecting and disconnecting the power supply, an energization indicating LED (light emitting diode) 33 which is lit when the power supply is connected, a recording mode change-over switch 34 for changing over a recording mode between a long time recording mode and a standard time recording mode, an LCD (liquid crystal display) 35 for displaying an operation mode of the VTR 19, the date and so on thereon, a display mode selection switch 36 for selecting whether an operation mode or the date is to be displayed on the LCD 35, and a pair of set switches 37, 38 for setting a date and so on, resetting a counter and entering the information into a memory therethrough.

The camera body 20 further has a diopter adjusting knob 39 located at a rear portion of the top face thereof for adjusting a diopter of the EVF 17, and an unlocking button 41 located at a left side face thereof as viewed from the rear for unlocking a battery case 40 which is removably mounted and locked in its mounted condition on the camera body 20 as seen in FIG. 2. Also located on the left side face of the camera body 20 are a cassette lid 42 for opening and closing an opening through which a cassette is loaded into and unloaded from the VTR 19, a fading switch 43 which causes, when it is depressed, fade out to be performed and causes, when it is then released, fade in to be performed, and a finder enlarging switch 44 for enlarging a view finder image within the EVF 17.

Located on a rear face of the camera body 20 are an eyepiece 45 which opposes to the EVF 17 within the camera body 20 and an eyepiece hood 46 which surrounds the eyepiece 45 as seen in FIG. 3. A DC input terminal 47 for receiving thereat a supply of power from a power supply adapter not shown is located alongside the eyepiece hood 46. A tracking knob 48 for causing tracking adjustment upon reproduction of a picture image by the VTR 19 is located at the top face of the camera body 20.

Located sidewardly of the battery case 40 are a remote control terminal 49 to which a connection cord is connected where operation of the VTR19 is to be controlled by means of a remote controller not shown, and an earphone terminal 50 to which an earphone not shown is connected where input/output of voices is to be monitored by the earphone. An AV (audio/video) terminal 51 for inputting and outputting a video signal and a sound signal therethrough is located on a side face of the grip 20A.

Figure 4:
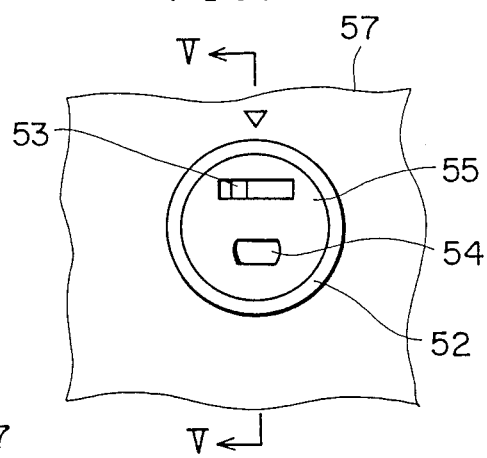
FIG. 4 is a front elevational view of a photographing optical system actuating operating device of the video camera.

The photographing optical system actuating operating device 26 mentioned above will now be described in more detail. Referring to FIGS. 2 and 4, the operating device 26 includes a manually operable ring 52 manually rotatable for alternatively performing a zooming operation and a focusing operation, an automatic focusing mode change-over switch 53 for changing over the operation mode of the camera upon automatic focusing between a spot mode and a wide mode, and a focusing mode change-over switch 54 manually depressible to alternately render automatic focusing and manual focusing effective.

Figure 5:
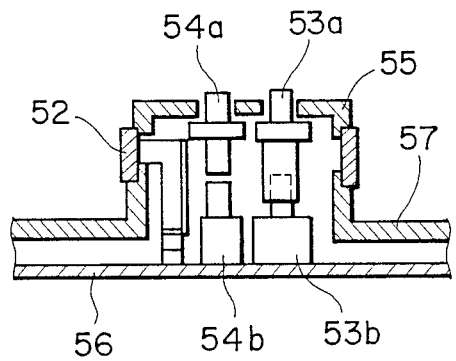
FIG. 5 is an enlarged sectional view taken along line V—V of FIG. 4.

Referring now to FIG. 5, the automatic focusing mode change-over switch 53 includes a lever member 53a which extends forwardly through and from a front plate 55 of the photographing optical system actuating operating device 26 for manual operation by a photographer, and a slide switch member 53b soldered to a circuit board 56 and having an element fitted in a lower end of the lever member 53a for sliding operation by the lever member 53a for production of a switching signal.

Meanwhile, the focusing mode change-over switch 54 includes a button member 54a which similarly extends forwardly through and from the front plate 55 for manual operation by a photographer, and a hold switch member 54b soldered to the circuit board 56 and having a portion located for engagement with a lower end of the button member 54a so that the hold switch member 54b may be alternatively opened and closed each time the button member 54a is depressed.

When the focusing mode change-over switch 54 is moved into a disable condition, the camera is put into an automatic focusing mode in which focusing of the camera is effected automatically, but when it is moved reversely into an enable condition, the camera is put into a manual focusing mode in which focusing is effected manually.

Meanwhile, when the camera is in the automatic focusing mode, the focal length of the photographing optical system PS can be continuously varied by revolving the manually operable ring 52.

In particular, referring to FIGS. 2 and 4, if the manually operable ring 52 is revolved in the clockwise direction, the photographing optical system PS will be zoomed to the short focal length side, that is, toward the wide (WIDE) side. On the contrary, if the manually operable ring 52 is revolved in the counterclockwise direction, the photographing optical system PS will be zoomed to the long focal length side, that is, toward the tele (TELE) side.

On the other hand, when the focusing mode change-over switch 54 is in its enable condition and accordingly the camera is in the manual focusing mode, the photographing optical system PS can be focused by manually revolving the manually operable ring 52.

In particular, if the manually operable ring 52 is manually revolved in the clockwise direction, the photographing optical system PS will be focused such that it may move to the far (FAR) side. On the contrary, if the manually operable ring 52 is revolved in the counter- clockwise direction, the photographing optical system PS will be focused such that it may moved toward the near (NEAR) side.

It is to be noted that groups of characters "T/N", "W/F" represent indices indicating directions of the zooming and focusing described above, respectively, with respect to a direction of revolution of the manually operable ring 52, and a mark of an inverted triangle between "T/N" and "W/F" represents an index indicating a neutral position of the manually operable ring 52. Those indices are embossed on a cover 57 which covers the front of the camera body 20.

Referring now to FIG. 6, an example of photographing lens system which may be used in the video camera of the embodiment described above is shown in cross section. The photographing lens system shown includes a set of front lenses 3, a set of variator lenses 4, a focusing lens 5, and a set of master lenses 11. The front lens set 3 of the photographing lens system is secured to a lens block 2. The variator lens set 4 (hereinafter referred to only as "variator") is mounted for sliding movement along a guide bar 121 which is in turn mounted in a parallel relationship to a direction of an optical axis of the lens block 2. The variator 4 is held in threaded engagement with a zooming lead screw 114 supported for rotation on the lens block 2 so that it may be moved in a direction of the photographing optical axis as the zooming lead screw 114 is rotated around a longitudinal axis thereof. The zooming lead screw 114 is connected to a zooming motor 118 by way of a gear train not shown. The variator 4 has a sliding brush 122 securely mounted thereon. The sliding brush 122 slidably moves on a contact of a zooming encoder 112 securely mounted on the lens block 2 in order to detect a position of the variator 4.

The focusing lens (which may be hereinafter referred to as "compensator") 5 is mounted for sliding movement on the guide bar 121 similarly to the variator 4 and is held in threaded engagement with an AF (automatic focusing) lead screw 113 which is also supported for rotation on the lens block 2 so that it may be moved in a direction of the photographing optical axis as the AF lead screw 113 rotates around its longitudinal axis. The AF lead screw 113 is connected to an AF motor 116 by way of a gear train 115 similarly as the zooming lead screw 114.

A half prism 10 is interposed between the compensator 5 and the master lens set 11. Thus, light from an object first passes the front lens set 3, variator 4 and compensator 5, and then most of the light is transmitted through the half prism 10 and, after passing the master lens set 11 and a low pass filter 106, introduced to an image pickup CCD 15. Meanwhile, the remaining part of the light from the object is bent at a right angle by the half prism 10, then reflected by a total reflection mirror 108 and, after passing a lens 109, received by a focus detecting device 110 in which an automatic focusing CCD line sensor and some other elements are contained. The total reflection mirror 108, lens 109 and focus detecting device 110 may be secured to the lens block 2 by a suitable means. Further, the master lens set 11, low pass filter 106, image pickup CCD 15 and an exposure meter 12 may also be secured to the lens block 2 by a suitable means.

Referring now to FIG. 7, general construction of the focus detecting device 110 is illustratively shown. As seen in FIG. 7, light from an object is caused to form two object images on two CCD line sensors 153 by means of a relay lens 150, a diaphragm mask 152 and a pair of image re-forming lenses 151. Relative positions of the two object images are detected to detect a defocused amount, that is, a deviation of the object from an in-focused position of the photographing lens system at an arithmetic processing device 154. In response to the defocused amount detected, the AF motor 116 is driven to rotate the AF lead screw 113 via the gear train 115 to move the compensator 5 in a direction of the optical axis under the guidance of the guide bar 121 until the compensator 5 reaches an in-focused position. Since a method of detecting an in-focused condition or a process of arithmetic operations has no direct relation with the present invention, description thereof will be omitted herein. For more detail, refer to a focus detecting device disclosed in Japanese Patent Laid-Open No. 60-4914.

Referring back to FIG. 6, when the variator 4 is to be moved, the manually operable ring 52 may be manually rotated in either direction to activate the zooming motor 118. As the zooming motor 118 rotates, the zooming lead screw 114 is rotated via the gear train not shown. Consequently, the variator 4 is moved by the zooming lead screw 114 under the guidance of the guide bar 121.

Figure 8:
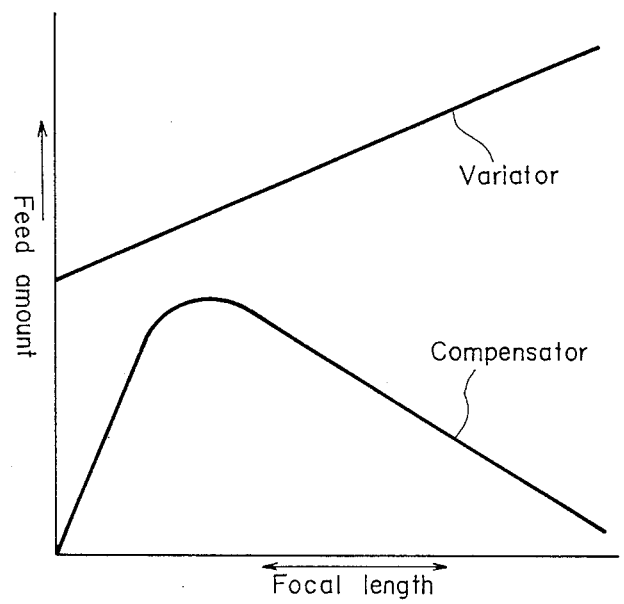
FIG. 8 is a diagram illustrating a feeding amount and a focal length of the photographing lens system.

Normally in a conventional photographing lens system having a zooming function, relative positions of a variator and a compensator are controlled as shown in FIG. 8 using a cam ring or the like in order to maintain the position of an image forming plane stationary even during zooming. However, the video camera of the present embodiment employs, in a zooming lens system, no such a connecting member as a cam ring of a conventional lens system in order to attain reduction in size and weight of the camera. Accordingly, in order to compensate for the image forming position during zooming, even if the distance to an object is constant, the compensator 5 must necessarily be actuated ceaselessly in order that it may follow the curve as shown in FIG. 8. The compensator 5 is actuated in response to a result of a focus detecting operation at the arithmetic processing device 154 as described hereinabove.

FIG. 9 schematically shown general construction of an actuating system for actuating the photographing lens system. Referring to FIG. 9, a microprocessor 160 includes the arithmetic processing device 154 which calculates a defocused amount in response to an output signal of the focus detecting device 110. The AF motor 116 and the zooming motor 118 are controlled by the microprocessor 160 via a driver circuit 161. The change-over switch 54 for changing over the video camera between an automatic focusing mode (hereinafter referred to as "AF mode") and another mode (hereinafter referred to as "LOCK mode") in which a focused position is locked once and focusing is to be effected manually is also connected to the microprocessor 160.

Thus, in the AF mode of the video camera, the focus detecting device 110 and the arithmetic processing device 154 operate to cause the AF motor 116 to move the compensator 5 to maintain the position of the image forming plane constant. If the manually operable ring 52 is rotated in either direction while the video camera is in the AF mode, the variator 4 is actuated by the zooming motor 118 to vary the focal length of the photographing lens system. During such zooming, change-over to the LOCK mode is inhibited.

On the other hand, when the video camera is in the LOCK mode, the focus detecting device 110 and the arithmetic processing device 154 are held inoperative and the variator 4 is held from movement while the compensator 5 may be moved by the AF motor 116 in response to an external compensator actuating signal and independently of an automatic focusing signal. This is commonly called power focusing which is a focusing method that is employed when automatic focusing is impossible (for example, when the contrast of an object is too low or when an object is too dark) or when it is desired to focus the camera upon a desired point, and in such power focusing, a compensator is actuated for focusing by an electrically driven means in response to manual operation.

Figure 10:
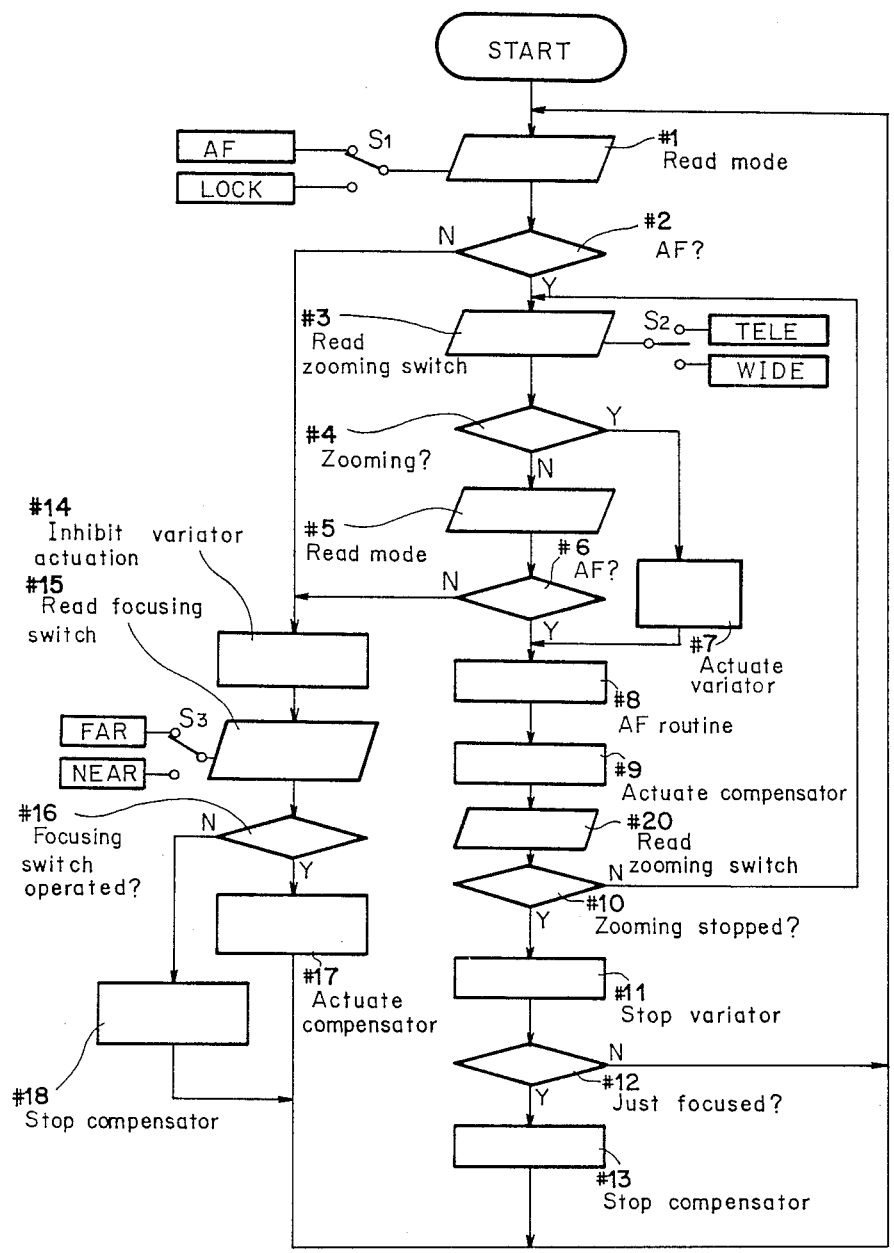
FIG. 10 is a flow chart illustrating operation of the video camera.

Referring now to FIG. 10, there is shown a flow chart which illustrates such operations of the video camera as described above. After starting of the system, the microprocessor 160 reads a present mode of the video camera at step #1. In particular, a position of a switch $S_1$ by means of which either the AF mode or the LOCK mode is selected and which corresponds to the change-over switch 54 described hereinabove is read in. After then, the mode selected by the switch $S_1$ is discriminated at step #2. In the case of the AF mode, a position of a zooming switch $S_2$ which indicates a direction of zooming either to the TELE side or to the WIDE side is read in at step #3. Here, the switch $S_2$ may be regarded as a switch which cooperates with the manually operable ring 52 of the photographing optical system actuating operating device 26 while the video camera is in the AF mode. Accordingly, when the manually operable ring 52 is rotated in either direction from its neutral position while the video camera is in the AF mode, the switch $S_2$ is switched to the TELE side or to the WIDE side. After reading of the zooming switch $S_2$, it is discriminated at step #4 if the zooming switch $S_2$ is operated, in order to determine whether or not the video camera is now zooming.

In case the video camera is not zooming, that is, when the switch $S_2$ is at its neutral position, a present mode is read in again at step #5. After then, it is discriminated at step #6 whether the video camera is in the AF mode or in the LOCK mode. In the case of the AF mode, an AF routine is executed at step #8 to calculate a defocused amount from the in-focused position, and then at step #9, the compensator 5 is moved in accordance with a result of the calculation. Subsequently, the zooming switch $S_2$ is read again in at step #20, and then it is discriminated at step #10 if zooming operation is stopped. Since here the camera is not zooming, it is discriminated at step #10 that zooming operation is stopped. Accordingly, the variator 4 is stopped subsequently at step #11, and then it is determined at step #12 if the camera comes into an in-focused condition. If the camera is under in-focused condition, then the compensator 5 is stopped at step #13, whereafter the sequence returns to step #1 in order to repeat a similar sequence of operations. On the other hand, in case it is determined at step #12 that the camera is not under in-focused condition, the sequence returns to step #1 while continuing actuation of the focusing compensator 5.

Meanwhile, in case the switch $S_2$ is connected either to the TELE side or to the WIDE side at the zooming switch reading step #3, it is determined subsequently at step #4 that the video camera is during zooming. Accordingly, the variator 4 is moved at step #7 in accordance with an instruction regarding a zooming direction by the switch $S_2$. Subsequently, the AF routine is executed at step #8 to perform a similar calculation for detection of a focused condition, and in response to a result of the calculation, the compensator 5 is actuated at step #9. After then, the zooming switch $S_2$ is read in at step #20, and in case the switch $S_2$ is at its neutral position, it is determined at step #10 that zooming operation is stopped. Accordingly, the variator 4 is stopped subsequently at step #11. Then, determination of an in-focused condition and stopping of the compensator 5 are executed at successive steps #12 and #13, respectively, and then the sequence returns to step #1.

To the contrary, when it is determined at step #10 that zooming operation is not yet stopped, the sequence returns to the zooming switch reading step #3. If zooming is determined also here at step #10, the sequence follows the steps #4, #7, #8, #9, #20 and #10 and returns to step #3, and this will be repeated while the mode reading step #5 is bypassed. As a result, change-over between the AF mode and the LOCK mode during zooming is inhibited.

In the meantime, when it is determined at step #2 or at step #6 that the video camera is not in the AF mode, that is, the video camera is in the LOCK mode, actuation of the variator 4 is first inhibited at step #14 because relative positions of the variator 4 and the compensator 5 cannot be compensated for using focus detection information. Subsequently, a position of a focusing switch $S_3$ is read in at step #15. Here, the switch $S_3$ may be regarded as a switch which cooperates with the manually operable ring 52 of the photographing optical system actuating operating device 26 while the video camera is in the LOCK mode. Accordingly, when the manually operable ring 52 is rotated in either direction from its neutral position while the video camera is in the LOCK mode, the switch $S_3$ is switched to the NEAR side or to the FAR side. Thus, in case either the FAR side or the NEAR side is selected by ths switch $S_3$ at step #15, it is determined at step #16 that the switch $S_3$ is operated, and then at step #17, the compensator 5 is actuated in accordance with a direction instruction given from the switch $S_3$. After then, the sequence returns to step #1. On the other hand, in case it is determined at step #16 that the switch $S_3$ is not operated, the compensator 5 is stopped at step #18 whereafter the sequence returns to step #1.

Figure 11:
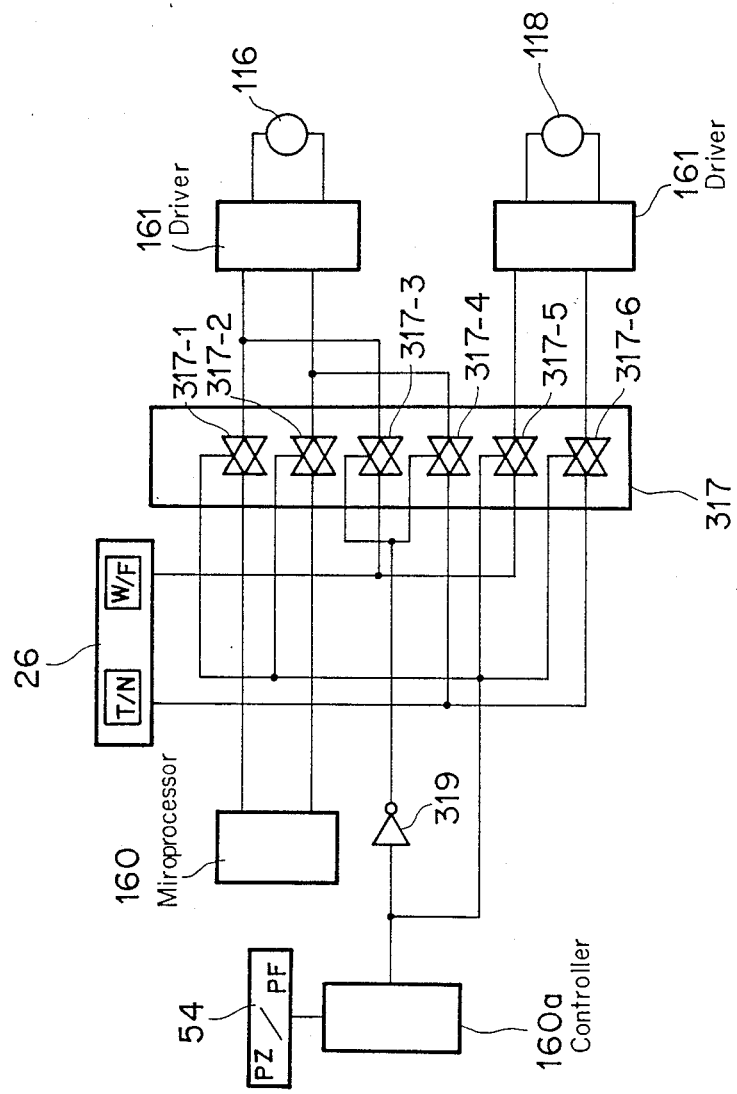
FIG. 11 is a block diagram showing construction of the actuating system of FIG. 9 in more detail.

FIG. 11 illustratively shows somewhat detailed construction of a circuit of the photographing lens actuating system which can attain the operations of the flow chart of FIG. 10. In particular, the circuit shown is constituted as a control circuit for controlling the AF motor 116 and the zooming motor 118 described hereinabove. The circuit shown includes an analog switch device 317 which includes up to 6 switches 317-1, 317-2, 317-3, 317-4, 317-5 and 317-6 and to which the AF motor 116 and the zooming motor 118 are shown connected individually via a pair of driver circuits 161. Here, it is to be noted that this is only for convenience of illustration and the circuit shown actually includes a single driver circuit 161 similarly as in FIG. 9 which selectively drives the AF motor 116 and the zooming motor 118 in response to an input signal thereto. The circuit further includes a controller 160a which, however, is actually included in the microprocessor 160 but is shown separately in FIG. 11 in order to distinctly illustrate its function. The controller 160a delivers from an output terminal thereof a voltage signal of a high ("H") level or a low ("L") level which is coupled directly to gate terminals of the analog switches 317-1, 317-2, 317-5 and 317-6 and via an inverter 319 to gate terminals of the analog switches 317-3 and 317-4 of the analog switch device 317. The analog switches 317-3 and 317-5 are connected to receive a signal delivered from a switch not shown which is turned on when the manually operable ring 52 of the photographing optical system actuating operating device 26 is rotated in one direction toward the WIDE or FAR side. Accordingly, the switch corresponds to the WIDE and FAR side contacts of the zooming and focusing switches $S_2$, $S_3$ described hereinabove with reference to FIG. 10. Meanwhile, the analog switches 317-4 and 317-6 are connected to receive a signal delivered from another switch not shown which is turned on when the manually operable ring 52 is rotated in the other direction toward the TELE or NEAR side. Accordingly, the switch similarly corresponds to the TELE and NEAR side contacts of the switches $S_2$, $S_3$. In FIG. 11, however, the photographing optical system actuating operating device 26 is shown, for convenience of illustration, including an operating member W/F for the WIDE and FAR and another operating member T/N for the TELE and NEAR side, and for convenience of description, the switches not shown are turned on when the respective operating members W/F and T/N are operated.

Here, it is assumed that the change-over operating member 54 is operated to the automatic focusing side. In response to such movement of the change-over operating member 54, a signal is delivered to the controller 160a. As a result, the controller 160a now changes its output from the low level to the high level thereby to render the analog switches 317-1, 317-2, 317-5 and 317-6 conducting while cutting off the remaining analog switches 317-3 and 317-4. Then, if the operating member W/F of the operating device 26 is operated, a signal is delivered therefrom and transmitted via the analog switch 317-5 to the motor driver circuit 161 to rotate the zooming motor 118 forwardly to actuate the variator 4 toward the WIDE side. On the other hand, if the other operating member T/N of the operating device 26 is operated, a signal is now transmitted via the analog switch 317-6 to the motor driver circuit 161 to rotate the zooming motor 118 in the reverse direction to actuate the variator 4 toward the TELE side. Meanwhile, the automatic focusing lens, that is, the compensator 5, is actuated in response to a signal received by the driver circuit 161 from the microprocessor 160 via the analog switch 317-1 or 317-2 in order to effect automatic focusing.

It is assumed here that the change-over operating member 54 is operated toward the manual focusing side. Thereupon, the output terminal of the controller 160a changes from the high level to the low level, and the signal of the low level is inverted into a signal of the high level by the inverter 319 and applied to the gate terminals of the analog switches 317-3, 317-4 to render the analog switches 317-3, 317-4 conducting. Meanwhile, the remaining analog switches 317-1, 317-2, 317-5 and 317-6 are now cut off. Then, if the operating member W/F of the operating device 26 is operated, a signal is applied via the analog switch 317-3 to the motor driving 161 to rotate the AF motor 116 forwardly to actuate the compensator 5 to move the focus to the FAR side. On the other hand, if the operating member T/N of the operating device 26 is operated, a signal is transmitted via the analog switch 317-4 to the driver circuit 161 to rotate the motor 116 reversely to actuate the compensator 5 to the NEAR side.

It is to be noted that while in the embodiment described above the AF motor and the zooming motor are provided separately, a single motor may otherwise be used for such two functions. In this instance, where there is the necessity of effecting zooming and focusing in a simultaneous manner, zooming operation will first be performed and then focusing operation may be performed. This will eliminate a possible disadvantage that the camera may be defocused upon zooming.

Now, description will be given of a modification to the embodiment of the present invention described above which is constituted such that the zooming speed and the focusing speed can be changed. In the modification, the appearance of a video camera and essential part of its controlling circuit are similar to those of the embodiment described above, and accordingly description thereof will be omitted herein. Further, like parts or elements in the modification are denoted by like reference numerals to those of the embodiment described above. This also applies to any other modification or embodiment described hereinbelow.

At first, a modified form of photographing optical system actuating operating device of the video camera will be described with reference to FIG. 13. The operating device includes a manually operable ring 52 which is mounted for rotation between a ring-shaped projection 57a of a cover 57 and a front plate 55. A bar member 52a is securely mounted on an inner periphery of the manually operable ring 52 and extends in a direction of an axis of rotation of the manually operble ring 52. A position detecting brush 58 is mounted at a rear end of the bar member 52a and has thereon three fingers for slidably contacting with a position detecting pattern 56A on a circuit board 56. Meanwhile, a pin member 52b is implanted at a front end of the bar member 52a.

The front plate 55 has two holes 55a, 55b formed therein, and a lever member 53a of an automatic focusing mode change-over switch 53 and a button member 54a of a focusing mode change-over switch 54 extend through the holes 55a, 55b, respectively.

Three boss portions 55c, 55d, 55e are formed projectingly on an inner face of the front plate 55 and each have a hole formed at an end portion thereof. Thus, by screwing tapping screws 59a, 59b, 59c into the holes of the boss members 55c, 55d, 55e, respectively, from the rear side of the cover 57, the front plate 55 is secured to the cover 57. Further, a spring plate 55f is secured by thermal caulking to the inner face of the front plate 55 and has a pair of rockable fingers located at left and right positions adjacent the pin member 52b located on the manually operable ring 52.

Figure 14:
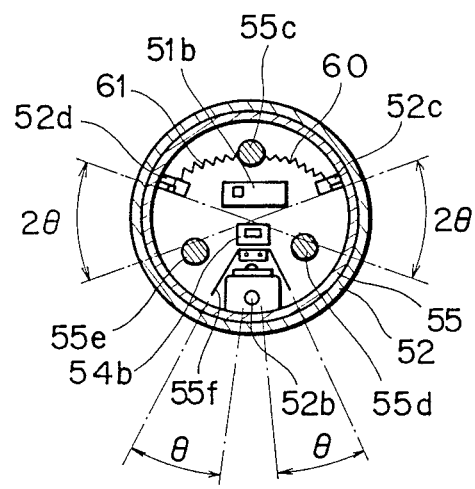
FIG. 14 is a schematic vertical sectional view of the photographing optical system actuating operating device of FIG. 13.

A pair of projections 52c, 52d are formed on an inner periphery of the manually operable ring 52, and a pair of coil springs 60, 61 extend between the uppermost boss member 55c of the front plate 55 and the projections 52c, 52d, respectively, as seen in FIG. 14.

The pair of projections 52c, 52d of the manually operable ring 52 and the other boss members 55d, 55e of the front plate 55 are arranged so as to be spaced from each other by an angle of $2\theta$ as seen in FIG. 14 so that a photographer may manually rotate the manually operable ring 52 by an angle of $2\theta$ in either of the clockwise and counterclockwise directions until it is stopped due to abutment of one of the pair of projections 52c, 52d of the manually operable ring 52 with the corresponding one of the pair of boss members 55d, 55e of the front plate 55.

Then, if the photographer releases the manually operable ring 52, the manually operable ring 52 will be rotated in a direction opposite to the direction of the preceding turning operation by an urging force of either one of the springs 60, 61 until a neutral position is reached at which the urging forces of the pair of springs 60, 61 are balanced with each other.

Meanwhile, the spring plate 55f provided on the front plate 55 is constituted such that the pair of rockable fingers thereof may each be spaced by an angle of $\theta$ from the pin member 52b provided on the manually operable ring 52. Thus, if the manually operable ring 52 is manually rotated in either direction beyond the angle $\theta$, the pin member 52b on the manually operable ring 52 is contacted with one of the rockable fingers of the spring plate 55f and is acted upon by a resisting force due to an elastic restoring force of the spring plate 55f.

Accordingly, an operation resistance to the manually operable ring 52 serving as a manually operating member for zooming within a first operating range of the angle "$\theta$" in either direction from the neutral position is differentiated from an operation resistance to the same within a second operating range from the angle "$\theta$" to the angle "$2\theta$" in either direction with respect to the neutral position by a combination of the pin member 52b and the spring plate 55f. Thus, the pin member 52b and the spring plate 55f constitute an operation resistance differentiating means for differentiating the operation resistance of the manually operable ring 52 at a boundary position between the first and second operating ranges.

Figure 15:
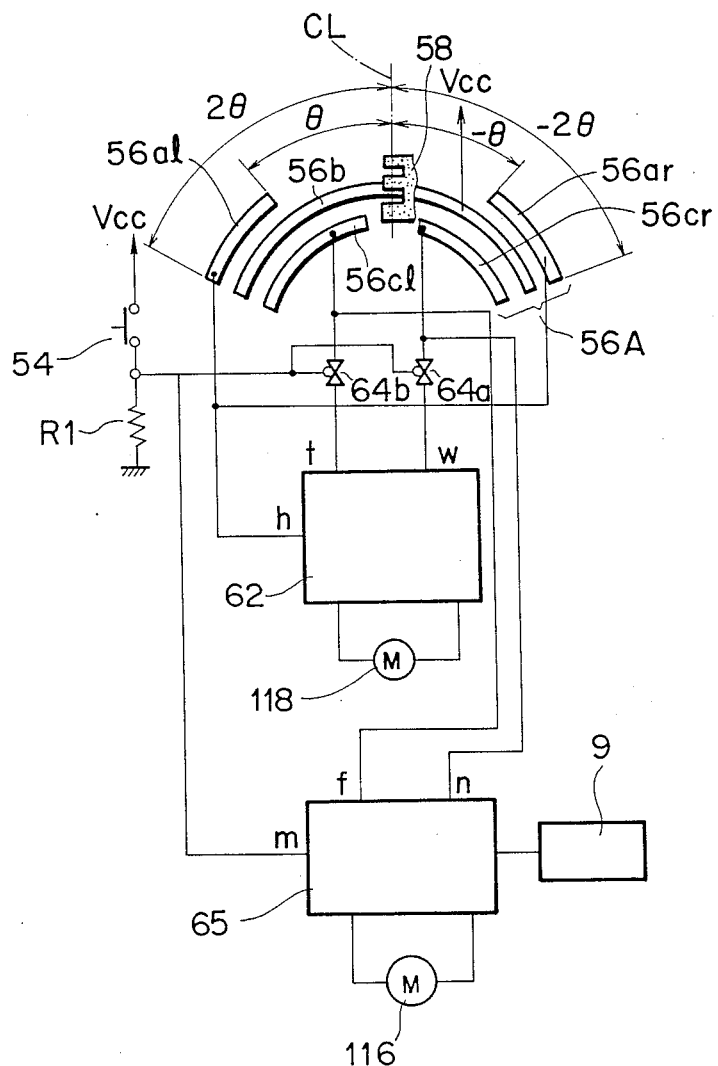
FIG. 15 is a schematic illustration showing a photographing optical system controlling device associated with the operating device of FIG. 13.

Referring now to FIGS. 13 and 15, the position detecting pattern 56A formed on the circuit board 56 includes three concentrical arcuate patterns which correspond to the three fingers of the position detecting brush 58.

The outermost arcuate pattern has two conductor sections 56al, 56ar which extend in opposite directions over ranges from the angle "$\theta$" to the angle "$2\theta$" and from the angle "$-\theta$" to the angle "$-2\theta$", respectively, with respect to an imaginary neutral line CL which extends in a vertical direction in FIGS. 13 and 15. Meanwhile, the mid arcuate pattern has a single conductor section 56b which continuously extends over a range from the angle "$-2\theta$" to the angle "$2\theta$" with respect to the imaginary neutral line CL. Finally, the innermost arcuate pattern has two conductor sections 56cl, 56cr which extend in opposite directions over ranges from symmetrical positions spaced by a distance of about 2 mm from the imaginary neutral line CL to the angles "$2\theta$" and "$-2\theta$" with respect to the imaginary neutral line CL.

As shown in FIG. 15, the two conductor sections 56al, 56ar of the outermost arcuate pattern are electrically connected to each other and also to an input terminal h of a zooming motor driver 62. Meanwhile, the conductor section 56b of the mid arcuate pattern is connected to a power source Vcc.

Thus, if the manually operable ring 52 is rotated until the brush 58 is contacted with one of the conductor sections 56al, 56ar of the outermost arcuate pattern to change the input signal to the input terminal h of the zooming motor driver 62 from the low level to the high level, the zooming motor driver 62 will drive the zooming motor 118 to rotate at a high speed to move the variator 4 toward the WIDE side or the TELE side. This operation will be hereinafter described in detail.

Further, the right-hand side one in FIG. 15 of the two conductor sections 56cl, 56cr of the innermost arcuate pattern, that is, the conductor section 56cr, is connected to a WIDE side input terminal w of the zooming motor driver 62 via a first analog gate 64a and directly connected to a NEAR side input terminal n of an AF motor driver 65. Meanwhile, the left-hand side conductor section 56cl in FIG. 15 is connected via a second analog gate 64b to a TELE side input terminal t of the zooming motor driver 62 and directly to a FAR side input terminal f of the AF motor driver 65.

The zooming motor driver 62 drives the zooming motor 118 to rotate in a direction to move the variator 4 toward the WIDE side when the input signal to the WIDE side input terminal w thereof is changed to the high level but drives the zooming motor 118 to rotate in the opposite direction to move the variator 4 toward the TELE side when the input signal to the TELE side input terminal t thereof is changed to the high level.

The two analog gates 64a, 64b mentioned above are connected to each other, grounded via a resistor R1, connected to the power source Vcc via the aforementioned focusing mode change-over switch 54, and also connected to an input terminal m of the AF motor driver 65.

The AF motor driver 65 and the zooming motor driver 62 correspond to the motor driver 161 of FIG. 11 for driving the AF motor 116 and the zooming motor 118.

When the focusing mode change-over switch 54 is in a closed position as a result of preceding depression of the button member 54a thereof, the two analog gate 64a, 64b are both in a cut off condition. In this instance, no input is applied to the WIDE side input terminal w nor the TELE side input terminal t of the zooming motor driver 62. Accordingly, the zooming motor 118 is not driven to rotate so that the variator 4 remains at a stopped position and accordingly the focal length of the photographing optical system PS is held fixed.

Meanwhile, since the focusing mode change-over switch 54 is closed, the input signal at the input terminal m of the AF motor driver 65 is at the high level. In this case, the video camera is in the manual focusing mode.

If the manually operable ring 52 is rotated in the clockewise direction in FIG. 15 until the conductor section 56b of the mid arcuate pattern and the right-hand side conductor section 56cr of the innermost arcuate pattern are electrically connected to each other by the brush 58, the input signal at the NEAR side input terminal n of the AF motor driver 65 changes into the high level. Consequently, the AF motor driver 65 drives the AF motor 116 to rotate in a direction to move the compensator 5 so that the focused position of the photographing optical system PS may approach the photographer.

To the contrary, if the manually operable ring 52 is rotated in the counterclockwise direction in FIG. 15 until the conductor section 56b of the mid arcuate pattern and the left-hand side conductor section 56cl of the innermost arcuate pattern are connected to each other by the brush 58, the input signal at the FAR side input terminal f of the AF motor driver 65 changes into the high level. Consequently, the AF motor driver 65 drives the focusing motor 116 to rotate in a direction to move the compensator 5 so that the focused position of the photographing optical system PS may go away from the photographer.

In this instance, the two analog gates 64a, 64b are both cut off as described above, and accordingly the two conductor sections 56cr, 56cl of the innermost arcuate pattern of the position detecting pattern 56A are connected only to the AF motor driver 65. Accordingly, in the manual focusing mode, focusing of the photographing optical system PS can be effected by a rotating operation of the manually operable ring 52 as described above.

On the other hand, when the focusing mode change-over switch 54 is held in its open position as a result of preceding depression of the button member 54a thereof, the two analog gates 64a, 64b are both in an open condition so that the two conductor sections 56cl, 56cr of the innermost arcuate pattern comprised of the position detecting pattern 56A are both connected to the zooming motor driver 62.

When the operating ring 58 is at its neutral position, the brush 58 assumes a position as shown in FIG. 15 in which a signal of the high level is not delivered to the WIDE side input terminal w nor to the TELE side input terminal t of the zooming motor driver 62. Accordingly, the zooming motor 118 is not driven to rotate so that the variator 4 will remain at a stopped position and accordingly the focal length of the photographing optical system PS will not change.

Meanwhile, since the focusing mode change-over switch 54 is open, the input signal at the input terminal m of the AF motor driver 65 is at the low level. In this instance, the video camera is in the automatic focusing mode. In the automatic focusing mode, the AF motor driver 65 controls driving of the AF motor 116 in response to an output signal of the automatic focusing sensor 9 in order to effect focusing of the photographing optical system PS.

If the manually operable ring 52 is rotated in the clockwise direction in FIG. 15 from the condition described just above until the conductor section 56b of the mid arcuate pattern and the right-hand side conductor section 56cr of the innermost arcuate pattern are connected to each other by the bruse 58, the input signal at the WIDE side input terminal w of the zooming motor driver 62 changes into the high level. Consequently, zooming to the WIDE side will be performed as described hereinabove.

On the other hand, if the manually oerable ring 52 is rotated in the counterclockwise direction in FIG. 15 until the conductor section 56b of the mid arcuate pattern and the left-hand side conductor section 56cl of the innermost arcuate pattern are connected to each other by the brush 58, the input signal at the TELE side input terminal t of the zooming motor driver 62 changes into the high level. Consequently, zooming to the TELE side will be performed as described hereinabove.

Thus, in the automatic focusing mode, in whichever direction the manually operable ring 52 is manually rotated, the input signal at the input terminal m of the AF motor driver 65 remains at the low level, and accordingly, automatic focusing operation responsive to an output signal of the automatic focusing sensor 9 continues.

If the amount of manual rotation of the manually operable ring 52 exceeds "$\theta$", the conductor section 56b of the mid arcuate pattern and one of the conductor sections 56al, 56ar of the outermost arcuate pattern are connected to each other by the brush 58. Consequently, the input signal at the input terminal h of the zooming motor driver 62 changes into the high level.

As a result, the zooming motor drive 62 drives the zooming motor 118 to rotate at a high speed. Thereupon, the operation resistance to the manually operable ring 52 changes as described hereinabove, which will cause the photographer to recognize that the zooming speed has been changed over to a high speed. Construction and operation of the zooming motor driver 62 will be described below.

Figure 12:
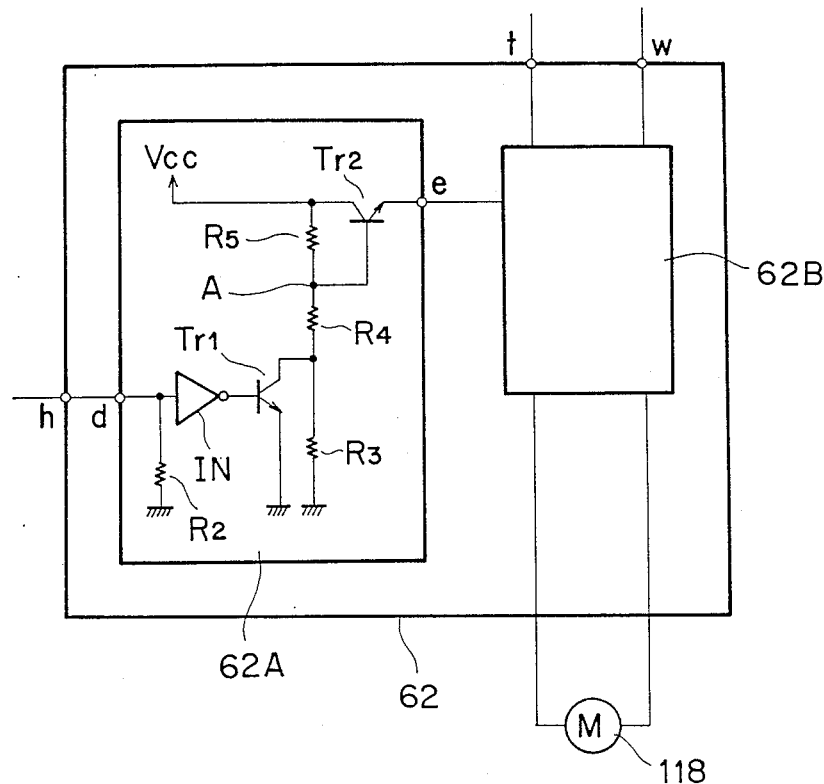
FIG. 12 is a circuit diagram showing details of a driver circuit for a zooming motor.

Referring to FIG. 12, the input terminal h of the zooming motor driver 62 is connected to an input terminal d of a driver circuit 62A for controlling a driving voltage for the zooming motor 118. The input terminal d of the driver circuit 62A is grounded via a resistor R2 and connected to an inverter IN. An output terminal of the inverter IN is connected to the base of a transistor Tr1. The emitter of the transistor Tr1 is grounded while the collector is connected to a junction point between two resistors R3, R4. The other end of the resistor R3 is grounded while the other end of the resistor R4 is connected to the base of another transistor Tr2 and also to a further resistor R5. The other end of the resistor R5 and the collector of the transistor Tr2 are connected to the power source Vcc, and the emitter of the transistor Tr2 is connected to an output terminal e of the driver circuit 62A.

The output terminal e of the driver circuit 62A is connected to an inverting circuit 62B to which the zooming motor 118 is connected. The WIDE side input terminal w and the TELE side input terminal t are also connected to the inverting circuit 62B. The inverting circuit 62B controls the direction of rotation of the zooming motor 118 in response to a level of an input signal to the WIDE side input terminal w and to the TELE side input terminal t described above.

Now, operation of the driver circuit 62A will be described. When the input signal at the input terminal d is at the low level, the output signal of the inverter IN changes into the high level because the input to the inverter IN is pulled down by the resistor R2. Consequently, the transistor Tr1 is rendered active.

In this instance, the voltage $V_{AL}$ at a junction point A between the two resistors R4, R5 is given by $$V_{Al} = Vcc \times \{r4/(r4+r5)\}$$

where Vcc is a power source voltage, r4 a resistance of the resistor R4, and r5 a resistance of the resistor R5. Meanwhile, the output voltage $V_{OL}$ of the transistor Tr2 is given by $$V_{OL} = Vcc \times \{r4/(r4+r5)\} - V_{BE} \quad (1)$$

where $V_{BE}$ is a voltage between the base and emitter of the transistor Tr2.

On the other hand, when the input signal at the input terminal d changes into the high level, the output signal of the inverter IN changes into the low level, and consequently the transistor Tr1 is rendered inactive. Accordingly, the voltage $V_{AH}$ at the junction point A is given by $$V_{AH} = Vcc \times \{(r3+r4)/(r3+r4+r5)\}$$

where r3 is a resistance of the resistor R3. Meanwhile, the output voltage $V_{OH}$ of the transistor Tr2 is given by $$V_{OH} = Vcc \times \{(r3+r4)/(r3+r4+r5)\} - V_{BE} \quad (2)$$

Thus, the resistances of the resistors R3 to R5 are determined so as to meet an expression $$V_{OL} < V_{OH}$$

by comparison between the equations (1) and (2) above.

In particular, upon manual rotation of the manually operable ring 52 beyond the angle "$\theta$" in either direction, a higher driving voltage is delivered from the output terminal e of the driver circuit 62A when the input signal at the input terminal d is at the high level than when the input signal is at the low level. As a result, the zooming motor 118 will be driven to rotate at a higher speed to perform zooming at a higher speed.

Thus, the driver circuit 62A of the zooming motor driver 62 constitutes a motor controlling means for controlling the zooming motor 118 such that the focal length changing speed when the manually operable ring 52 serving as a manually operating member for the zooming motor 118 is operated in the second operating range for an angle greater than the angle "$\theta$" may be differentiated from the focal length changing speed when the manually operable ring 52 is operated in the first operating range for an angle smaller than the angle "$\theta$" preceding to the second operating range.

In is to be noted that since in the modification described above the operation resistance provided by an urging force of spring means varies between the first and second operating ranges, the focal length changing speed may otherwise be changed continuously in accordance with an amount of operation of the manually operable ring 52 individually in the lower and higher speed sides such that the change of the focal length changing speed may be recognized by a change of the operating resistance.

Figure 16:
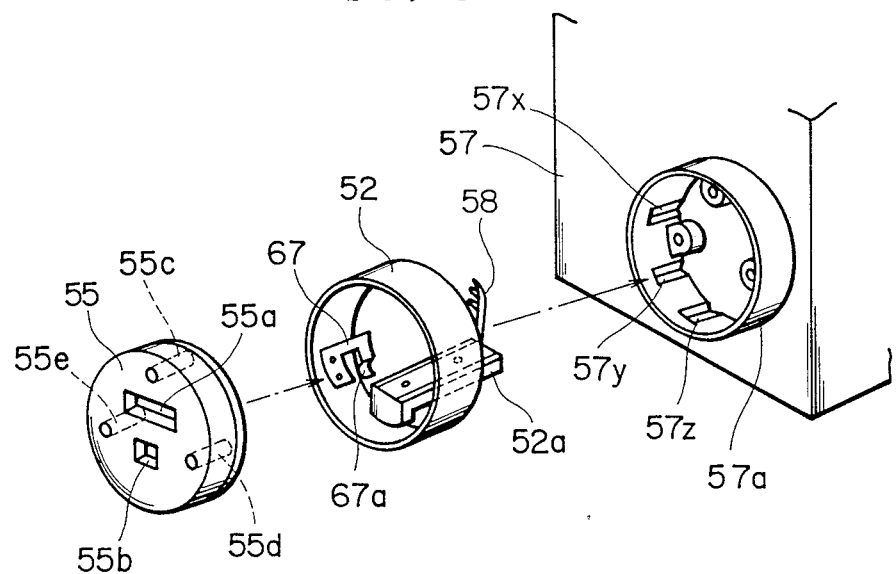
FIG. 16 is a fragmentary perspective view showing another modified form of photographing optical system actuating operating device for a video camera.

FIG. 16 shows a modification to the manually operable ring 52 of FIG. 13. In the modification shown in FIG. 16, the pin 52d of the manually operable ring 52 and the spring plate 55f of the front plate 55 are omitted. In place, an engaging member 67 formed from a spring plate is secured by thermal caulking to an inner periphery of the manually operable ring 52.

Meanwhile, three engaging notches or grooves 57x, 57y, 57z are formed in a spaced relationship by an angle of "$\theta$" in a circumferential direction on an inner periphery of the ring-shaped projection 57a of the cover 57 such that they may be engaged by an engaging portion 67a formed at a free end of the engaging member 67.

When the manually operable ring 52 is at its neutral position, the engaging portion 67a of the engaging member 67 engages with the mid engaging notch 57y of the projection 57a. As the manually operable ring 52 is rotated in either direction, the engaging portion 67a of the engaging member 67 is disengaged from the mid engaging notch 57y, slides along the inner periphery of the ring-shaped projection 57a, and is finally engaged with either one of the opposite side engaging notches 57x, 57z just when the rotational operation angle of the manually operable ring 52 reaches "$\theta$".

As the manually operable ring 52 is rotated further, the engaging portion 67a is disengaged from the engaging notch 57x or 57z and slides along the inner periphery of the ring-shaped projection 57a until the rotational operation angle of the manually operable ring 52 reaches "$2\theta$".

In the present modification, the operation resistance to the manually operable ring 52 is once decreased and then increased again at a boundary between the first and second operating ranges of the manually operable ring 52 due to engagement of the engaging portion 67a of the engaging member 67 with one of the opposite engaging notches 57x, 57z. Due to such a change in operation resistance, the photographer can recognize that the zooming speed has been changed.

Thus, it will be appreciated that an operation resistance differentiating means is constituted by the engaging member 67 and the cooperating two engaging portions 57x, 57z. It is to be noted that construction and operation of other portions of the operating ring than those described above are similar to those of the preceding modification described above, and accordingly like parts or components are denoted by like reference numerals to those of the preceding modification and detailed description thereof are omitted herein.

It is to be noted that the number of steps of the zooming speed by the driver circuit 62A of the zooming motor driver 62 serving as a motor controlling means depending upon an operation amount of the manually operable ring or member 52 may be three or more, and in such a case, a change in operation resistance may be provided at each boundary by similar means as described hereinabove.

Figure 17:
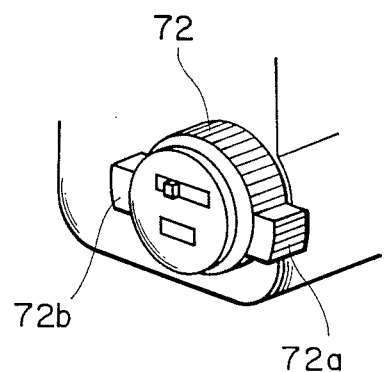
FIGS. 17 and 18 are perspective views showing different modified forms of manually operable member of a photographing optical system actuating operating device.
Figure 18:
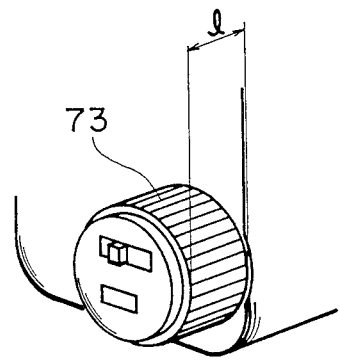

It is to be noted that while the manually operable ring 52 of the photographing optical system actuating operating device 26 described hereinabove with specific reference to FIG. 4 or FIG. 13 is mounted for manual rotation by a photographer, it may have an additional means or a specific configuration for facilitating such manual rotation. For example, referring to FIG. 17, a manually operable ring 72 may have a pair of radial projections 72a, 72b formed at diametrical positions of an outer periphery thereof for facilitating manual rotation of the manually operable ring 72 by a photographer. Or alternatively, referring to FIG. 18, a manually operable ring 73 may have a great or increased width "l", that is, a length in an axial direction thereof, for a similar purpose.

Now, a video camera of another embodiment of the present invention will be described with reference to a schematic illustration of FIG. 19. The present embodiment is constituted such that an operating member for focusing is provided separately from an operating member for zooming. In particular, the video camera shown includes a focusing mode change-over switch 54 for alternatively changing over focusing of the video camera between an AF mode and a LOCK mode. A microprocessor 160 is connected to the focusing mode change-over switch 54 such that when the switch 54 is turned off, the video camera is put into the AF mode, but when the switch 54 is turned on, the video camera is put into the LOCK mode. The microprocessor 160 is further connected to a power focusing operating switch device S₃ which includes a NEAR switch S₃A for moving a compensator 5 to the NEAR side and a FAR switch S₃B for moving the compensator 5 to the FAR side. The microprocessor 160 is further connected to a zooming operating switch device S₂ which includes a TELE switch S₂A for zooming toward the TELE side and a WIDE switch S₂B for zooming toward the WIDE side. When the LOCK mode is selected by the change-over switch 54, the microprocessor 160 rejects zooming operation which will otherwise be performed in response to a signal from the zooming operating switch device S₂ or the power focusing operating switch device S₃.

Now, operation of the present embodiment will be described. At first, the microprocessor 160 determines whether the change-over switch 54 is positioned for the AF mode or for the LOCK mode. In the case of the AF mode, the microprocessor 160 calculates for detection of a focused condition in accordance with a detection signal from a focus detecting device 110 and then controls a driver circuit 161 using a signal of a result of the calculation to drive the AF motor 116 to move the compensator 5 in order to focus the photographing optical system upon an object. In this case, if the zooming operating switch device S₂ is operated, the microprocessor 160 controls the driver circuit 161 to additionally drive the zooming motor 118 to move a variator 4. As the variator 4 moves, relative positions of a front lens set 3, the variator 4 and the compensator 5 are varied so that the position of an image forming plane is varied. Consequently, light delivered from the object to the focus detecting device 110 changes, and as a result, the result of the calculation for detection of a focused condition changes. In response to the changed result of the calculation, the compensator 5 is adjusted finely. In this manner, the position of the image forming plane is incessantly compensated for in response to movement of the variator 4 in order to obtain an in-focused video image. It is to be noted that while the video camera is in the AF mode, the microprocessor 160 inhibits input thereto of a signal from the power focusing operating switch device S₃. This is because otherwise if a signal which would cause an operation inconsistent with a focusing operation which is being performed by operation of the AF motor 116 in accordance with a result of a focus detecting calculation is received from outside and accepted by the microprocessor 160, it would cause an operation in error.

Now, operation when the change-over switch 54 is positioned for the LOCK mode in which power focusing is performed will be described. In the LOCK mode, the microprocessor 160 inhibits input thereto of a signal from the focus detecting device 110 to inhibit an automatic focusing operation while it inhibits input thereto from the zooming operating switch device S₂ to inhibit a zooming operation. In this condition, if the NEAR switch S₃A or the FAR switch S₃B of the power focusing operating switch S₃ is turned on, the microprocessor 160 detects this and controls the driver circuit 161 to drive the AF motor 116 to move the compensator 5 to the NEAR or FAR side.

Figure 20:
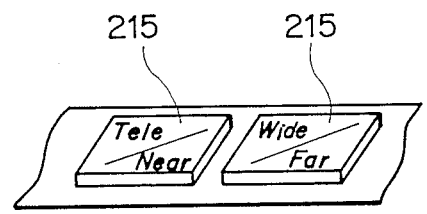
FIG. 20 is a perspective view of a photographing optical system actuating operating device in a different form.

Now, a modification to the embodiment of FIG. 4 will be described with reference to FIG. 20. In the present modification, an operating means for power zooming and for manual focusing includes two push buttons 215. One of the two push buttons is an operating member for moving the lens to the TELE side when power zooming is to be effected and for moving the lens to the NEAR side when manual focusing is to be effected and has an indication of "Tele/Near" provided on a surface thereof. The other push button is an operating member for moving the lens to the WIDE side when power zooming is to be effected and for moving the lens to the FAR side when manual focusing is to be effected and has an indication of "Wide/Far" provided on a surface thereof. The two operating members 215 are located in a juxtaposed relationship at a suitable position of an upper face of a camera body as shown in FIG. 20.

It is to be noted that, while not specifically shown in the drawings, a manual operating member may have any other form such as, for example, a form of a lever, and construction of the operation resistance differentiating means may be changed suitably.

Further, the present invention can be applied, in addition to an electrically driven zooming device incorporated in a video camera as described in connection with the various embodiments or modifications, to any other electrically driven zooming device of a still camera in which a zooming lens is either removably or fixedly mounted.

Having now fully described the invention, it will be apparent to one of ordinary skill in the art that may changes and modifications can be made thereto without departing from the spirit and scope of the invention as set forth herein.

What is claimed is:

1. A camera, comprising:
   a lens device including a zooming lens system and a focusing lens system;
   first actuating means for actuating said zooming lens system for zooming;
   second actuating means for actuating said focusing lens system for focusing;
   manually operable mode change-over means for alternatively changing over said camera between a zooming mode in which a zooming operation is performed by said first actuating means and a focusing mode in which a focusing operation is performed by said second actuating means;
   manually operable moving direction instructing means for instructing a direction of movement of said zooming or focusing lens system for zooming or focusing; and
   control means operable in response to the zooming mode selected by said mode change-over means for causing said first actuating means to perform a zooming operation in response to said moving direction instructing means and operable in response to the focusing mode selected by said mode change-over means for causing said second actuating means to perform a focusing operation in response to said moving direction instructing means.

2. A camera as claimed in claim 1, wherein said moving direction instructing means includes a first manually operable member manually operable for instructing said control means to control, when the zooming mode is selected, said first actuating means to move said zooming lens system in a first zooming direction and to control, when the focusing mode is selected, said second actuating means to move said focusing lens system in a first focusing direction, and a second manually operable member manually operable for instructing said control means to control, when the zooming mode is selected, said first actuating means to move said zooming lens system in a direction opposite to the first zooming direction and to control, when the focusing mode is selected, said second actuating means to move said focusing lens system in a direction opposite to the first focusing direction.

3. A camera as claimed in claim 1, wherein said moving direction instructing means includes a single manually operable member manually operable in a first direction for instructing said control means to control, when the zooming mode is selected, said first actuating means to move said zooming lens system in a first zooming direction and to control, when the focusing mode is selected, said second actuating means to move said focusing lens system in a first focusing direction, and manually operable in a second direction for instructing said control means to control, when the zooming mode is selected, said first actuating means to move said zooming lens system in a direction opposite to the first zooming direction and to control, when the focusing mode is selected, said second actuating means to move said focusing lens system in a direction opposite to the first focusing direction.

4. A camera as claimed in claim 3, wherein said manually operable member of said moving direction instructing means is located around a manually operable portion of said mode change-over means.

5. A camera as claimed in claim 4, wherein said manually operable member of said moving direction instructing means is in the form of a ring.

6. A camera as claimed in claim 4, wherein said manually operable member of said moving direction instructing means is in the form of a wide ring.

7. A camera as claimed in claim 5 or 6, wherein said ring has a projection for manual operation provided thereon.

8. A camera as claimed in claim 1, further comprising focus detecting means for detecting a focused condition of said focusing lens system, and automatic focusing means operable in response to said focus detecting means for driving said second actuating means, whereby, when the zooming mode is selected by said mode change-over means, said automatic focusing means operates in response to said focus detecting means to cause said control means to control said second actuating means to actuate said focusing lens system for focusing.

9. A camera as claimed in claim 4, further comprising focus detecting means for detecting a focused condition of said focusing lens system, and automatic focusing means operable in response to said focus detecting means for driving said second actuating means, whereby, when the zooming mode is selected by said mode change-over means, said automatic focusing means operates in response to said focus detecting means to cause said control means to control said second actuating means to actuate said focusing lens system for focusing.

10. A camera as claimed in claim 4, wherein said manually operable member of said moving direction instructing means has a first operating range in which said zooming lens system is actuated at a first speed and a second operating range in which said zooming lens system is actuated at a speed different from the first speed, said manually operable member presenting a change in operation resistance at a boundary between said first and second operating ranges.

11. A camera, comprising:
    a lens device including a zooming lens system and a focusing lens system;
    first actuating means for actuating said zooming lens system for zooming;
    second actuating means for actuating said focusing lens system for focusing;
    focus detecting means for detecting a focused condition of said focusing lens system;
    automatic focusing means operable in response to said focus detecting means for driving said second actuating means;
    a first manually operable member manually operable for focusing;

a second manually operable member manually operable for causing said first actuating means to actuate said zooming lens system for zooming;

manually operable mode change-over means for alternatively changing over said camera between an automatic focusing mode in which said second actuating means operates in response to said automatic focusing means to actuate said focusing lens system for focusing and a manual focusing mode in which said second actuating means operates in response to operation of said first manually operable member to actuate said focusing lens system for focusing; and control means operable in response to the manual focusing mode selected by said mode change-over means for invalidating operation of said second manually operable member to inhibit a zooming operation of said zooming lens system.

12. A camera as claimed in claim 11, further comprising a grip section adapted to be gripped by a photographer, said first and second manually operable members being located such that they may not be operated by a hand which takes hold of said grip section therein.

13. A camera as claimed in claim 12, wherein said first manually operable member includes an operating member for activating said second actuating means to actuate said focusing lens system.

14. A camera as claimed in claim 13, wherein said zooming lens system includes a variator lens, and said focusing lens system includes a compensator lens.

15. A camera, comprising:
a lens device including a first lens group for zooming and a second lens group for focusing and for compensating an image deviation by zooming operation of said first lens group;
first actuating means for actuating said first lens group for zooming;
second actuating means for actuating said second lens group for focusing;
focus detecting means for detecting a focused condition of said second lens group;
automatic focusing means operable in response to said focus detecting means for driving said second actuating means;
a first manually operable member manually operable for focusing;
a second manually operable member manually operable for causing said first actuating means to actuate said first lens group for zooming;
manually operable mode change-over means for alternatively changing over said camera between an automatic focusing mode in which said second actuating means operates in response to said automatic focusing means to actuate said second lens group for focusing and a manual focusing mode in which said second actuating means operates in response to operation of said first manually operable member to actuate said second lens group for focusing; and
control means operable in response to the manual focusing mode selected by said mode change-over means for invalidating operation of said second manually operable member to inhibit a zooming operating of said first lens group.

16. A camera as claimed in claim 15, wherein said first manually operable member includes an operating member for activating said second actuating means to actuate said focusing lens system.

17. A camera as claimed in claim 15, wherein said first lens group includes a variator and said second lens group includes a compensator.

18. A camera, comprising:
a lens device including a first lens group for zooming and a second lens group for focusing and for compensating an image deviation by zooming operation of said first lens group;
first actuating means for actuating said first lens group for zooming;
second actuating means for actuating said second lens group for focusing;
focus detecting means for detecting a focused condition of said second lens group;
automatic focusing means operable in response to said focus detecting means for driving said second actuating means;
a first manually operable member manually operable for stopping focusing by said automatic focusing means and for locking a focused condition when focusing is stopped;
a second manually operable member manually operable for causing said first actuating means to actuate said first lens group for zooming; and
control means operable when a focused condition is locked in response to operation of said first manually operable member for invalidating operation of said second manually operable member to inhibit a zooming operation of said first lens group.

19. A camera as claimed in claim 18, wherein said first lens group includes a variator and said second lens group includes a compensator.

20. A camera, comprising:
a lens device including a first lens group for zooming and a second lens group for focusing and for compensating an image deviation by zooming operation of said first lens group;
first actuating means for actuating said first lens group for zooming;
second actuating means for actuating said second lens group for focusing;
focus detecting means for detecting a focused condition of said second lens group;
automatic focusing means operable in response to said focus detecting means for driving said second actuating means;
a first manually operable member manually operable for focusing;
a second manually operable member manually operable for causing said first actuating means to actuate said first lens group for zooming;
manually operable mode change-over means for alternatively changing over said camera between an automatic focusing mode in which said second actuating means operates in response to said automatic focusing means to actuate said second lens group for focusing and a manual focusing mode in which said second actuating means operates in response to operation of said first manually operable member to actuate said second lens group for focusing;
zooming operation detecting means for detecting whether or not a zooming operation is being performed; and
control means operable when said zooming operating detecting means detects that a zooming operation is being performed for inhibiting a change-over from the automatic focusing mode to the manual focusing mode irrespective of operation of said mode change-over means.

21. A camera as claimed in claim 20, wherein said zooming operation detecting means detects whether a zooming operation is being performed or not by detecting whether said second manually operable member is operated or not.

22. A camera as claimed in claim 20, wherein said first lens group includes a variator and said second lens group includes a compensator.

23. A camera, comprising:
   a lens device including a first lens group for zooming and a second lens group for focusing and for compensating an image deviation by zooming operation of said first lens group;
   first actuating means for actuating said first lens group for zooming;
   second actuating means for actuating said second lens group for focusing;
   focus detecting means for detecting a focused condition of said second lens group;
   automatic focusing means operable in response to said focus detecting means for driving said second actuating means;
   a first manually operable member manually operable for stopping focusing by said automatic focusing means and for locking a focused condition when focusing is stopped;
   a second manually operable member manually operable for causing said first actuating means to actuate said first lens group for zooming;
   zooming operation detecting means for detecting whether or not a zooming operation is being performed; and
   control means operable when said zooming operating detecting means detects that a zooming operation is being performed for inhibiting locking of a focused condition irrespective of operation of said first manually operable member.

24. A camera as claimed in claim 23, wherein said zooming operation detecting means detects whether a zooming operation is being performed or not by detecting whether said second manually operable member is operated or not.

25. A camera as claimed in claim 23, wherein said first lens group includes a variator and said second lens group includes a compensator.

26. A camera, comprising:
   a lens device including a focusing lens system;
   first actuating means for actuating said focusing lens system for focusing;
   focus detecting means for detecting a focused condition of said focusing lens system;
   automatic focusing means operable in response to said focus detecting means for driving said first actuating means;
   manually operable means manually operable for causing said first actuating means to actuate said focusing lens system for focusing;
   mode change-over means manually operable for alternatively changing over said camera between an automatic focusing mode in which said automatic focusing means operates in response to said focus detecting means to cause said first actuating means to actuate said focusing lens system for focusing and a manual focusing mode in which said first actuating means is caused by said manually operable means to actuate said focusing lens system for focusing;
   said mode change-over means including a manually operable member around which a portion for manual operation of said manually operable means is located.

27. A camera as claimed in claim 23, wherein said portion for manual operation of said manually operable means is in the form of a ring.

28. A camera as claimed in claim 26, wherein said portion for manual operation of said manually operable means is in the form of a wide ring.

29. A camera as claimed in claim 27 or 28, wherein said portion for manual operation of said manually operable means in the form of a ring has a projection for manual operation provided thereon.

* * * * *